(12) United States Patent  
Giovannelli (10) Patent No.: US 8,788,595 B2  
(45) Date of Patent: Jul. 22, 2014

(54) METHODS, SYSTEMS, AND COMPUTER PROGRAM PRODUCTS FOR INSTANT MESSAGING

(75) Inventor: Jason Sturgill Giovannelli, Fairfax, VA (US)

(73) Assignee: The MITRE Corporation, McLean, VA (US)

(*) Notice: Subject to any disclaimer, the term of this patent is extended or adjusted under 35 U.S.C. 154(b) by 0 days.

(21) Appl. No.: 12/276,750

(22) Filed: Nov. 24, 2008

(65) Prior Publication Data

US 2010/0131599 A1    May 27, 2010

(51) Int. Cl.
G06F 15/16      (2006.01)
H04L 12/58      (2006.01)
H04L 29/08      (2006.01)

(52) U.S. Cl.
CPC ............... *H04L 51/04* (2013.01); *H04L 51/12* (2013.01); *H04L 67/2823* (2013.01)
USPC ........................................................ 709/206

(58) Field of Classification Search
CPC ....... H04L 51/04; H04L 51/12; H04L 67/125; H04L 67/2823
USPC ......... 709/233, 228, 227, 223, 207, 206, 203, 709/200, 224, 220, 229; 370/502, 468, 466, 370/465, 410, 401, 400, 398, 395.53, 395.1, 370/392, 390, 389, 360, 356; 713/176, 164, 713/151, 172, 171, 170, 168, 155; 726/22, 726/16, 1; 715/777, 765, 764, 745, 715; 340/573.1
See application file for complete search history.

(56) References Cited

U.S. PATENT DOCUMENTS

| | | | | |
|---|---|---|---|---|
| 6,484,196 B1* | 11/2002 | Maurille | ....................... | 709/206 |
| 7,346,779 B2* | 3/2008 | Leeper | ........................ | 713/186 |
| 7,461,378 B2* | 12/2008 | Beyda | ............................ | 719/313 |
| 2003/0217259 A1* | 11/2003 | Wong et al. | ................... | 713/153 |
| 2008/0049937 A1* | 2/2008 | Pauker et al. | ................ | 380/270 |
| 2009/0063637 A1* | 3/2009 | Sun et al. | ..................... | 709/206 |

* cited by examiner

*Primary Examiner* — Waseem Ashraf  
*Assistant Examiner* — Charles Murphy  
(74) *Attorney, Agent, or Firm* — Sterne, Kessler, Goldstein & Fox PLLC (57) ABSTRACT

Systems, methods and computer program products for monitoring the receipt of instant messages between two or more participants in a messaging environment are described herein. An embodiment of the invention operates by receiving a message from a sender. The message is displayed in a chat client of a recipient. Such message is displayed in an encrypted form to prevent human intelligible display of the message. An indication of selection of the message by the recipient is received. Thereafter, the message is displayed in the chat client in an unencrypted form, and an acknowledgement is sent to the sender. The sender updates a message status identifier by filling the message status identifier with a color or updating an icon or any other visual cue or identifier, uniquely identifying the message recipient, to thereby note the selection of the message by the recipient. In this way, the recipient of a message must select the message in order to view the message in its unencrypted form. When the recipient selects the message with a mouse pointer or any other interaction method, an acknowledgement is sent to the sender, indicating that the message has been viewed by the recipient. This prevents an assumption by the sender that the message has been viewed by the recipient until it is actually viewed in its unencrypted form.

11 Claims, 5 Drawing Sheets

FIG. 5 ously. However, no indication is provided to the sender to indicate that the message was indeed seen by the recipient. For example, a user may send a time sensitive or mission critical message assuming that it has been viewed by the recipient because of its near instantaneous transmittal time. However, the recipient may not view the message until some time in the future. In such situations, it is difficult for a sender to determine if the message has been correctly received and timely viewed by its intended recipient.

METHODS, SYSTEMS, AND COMPUTER PROGRAM PRODUCTS FOR INSTANT MESSAGING

BACKGROUND

1. Field of the Invention

The present invention relates to instant messaging technology.

2. Background Art

The emergence and development of computer networks and protocols, including the World Wide Web (or simply "the web"), allows many remote users to communicate with one another. Different types of communication tools have been developed for computer networks which allow users to communicate in different ways. One popular type of communication tool is instant messaging (also called chat). Instant messaging (IM) allows users to communicate over a network in real time. A user uses a client program (called an IM client) that communicates with other IM clients over the network. The IM client has a graphical user-interface (GUI) that allows a user to input text and view text.

IM communication has generally involved typing text. For example, two users chatting may type lines of text in each of their IM client programs. The lines of text may resemble a conversation in that successive lines of text are displayed in a temporal sequence along with an indication of the user who typed the text. Often this indication of the user is a display of the user's screen name (also called an IM address). IM clients have historically had simple GUIs with rectangular window displays in which the text of a chat is made to scroll as the conversation proceeds.

In most cases, a user (e.g. a sender) types in a message and sends it to a recipient, and the recipient is able to view the message almost instantaneously. However, no indication is provided to the sender to indicate that the message was indeed seen by the recipient. For example, a user may send a time sensitive or mission critical message assuming that it has been viewed by the recipient because of its near instantaneous transmittal time. However, the recipient may not view the message until some time in the future. In such situations, it is difficult for a sender to determine if the message has been correctly received and timely viewed by its intended recipient.

Therefore, what is needed is a system, method and computer program product that transmits and receives instant messages in a manner that overcomes the limitations of existing IM techniques.

BRIEF SUMMARY

Briefly stated, the invention includes system, method, computer program product embodiments and combinations and sub-combinations thereof for monitoring the receipt of instant messages between two or more participants in a messaging environment.

An embodiment of the invention operates by receiving a message from a sender. The message is displayed in a chat client of a recipient. Such message is displayed in an encrypted form to prevent human intelligible display of the message. An indication of selection of the message by the recipient is received. Thereafter, the message is displayed in the chat client in an un-encrypted form, and an acknowledgement is sent to the sender.

The sender updates a message status identifier by filling the message status identifier with a color associated with the recipient, to thereby note the selection of the message by the recipient. It is to be appreciated that the sender can update a message status identifier by any other means, including but not limited to an icon or any other visual cue or identifier uniquely identifying the message recipient.

In this way, the recipient of a message must select the message (e.g. by using a mouse pointer) in order to view the message in its unencrypted form. When the recipient selects the message, an acknowledgement is sent to the sender, indicating that the message has been selected by the recipient. This prevents an assumption by the sender that the message has been viewed by the recipient until it is actually displayed in its unencrypted form.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods, and computer program products for monitoring the receipt of instant messages between two or more participants in a messaging environment.

An embodiment of the invention operates by receiving a message from a sender. The message is displayed in a chat client of a recipient. Such message is displayed in an encrypted form to prevent human intelligible display of the message. An indication of selection of the message by the recipient is received. Thereafter, the message is displayed in the chat client in an un-encrypted form, and an acknowledgement is sent to the sender.

The sender updates a message status identifier by filling the message status identifier with a color associated with the recipient, to thereby note the selection of the message by the recipient. It is to be appreciated that the sender can update a message status identifier by any other means, including but not limited to an icon or any other visual cue or identifier uniquely identifying the message recipient.

In this way, the recipient of a message must select the message in order to view the message in its unencrypted form. As an example, the recipient may select the message using a mouse pointer to view the message in its unencrypted form.

When the recipient selects the message, an acknowledgement is sent to the sender, indicating that the message has been viewed by the recipient. This prevents an assumption by the sender that the message has been viewed by the recipient until it is actually viewed in its unencrypted form.

The terms "instant messaging" (IM) and "chat" are used interchangeably herein to refer broadly and inclusively to any instant messaging application, protocol, framework or service as would be apparent to a person skilled in the art given this description.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

System

Figure 1:
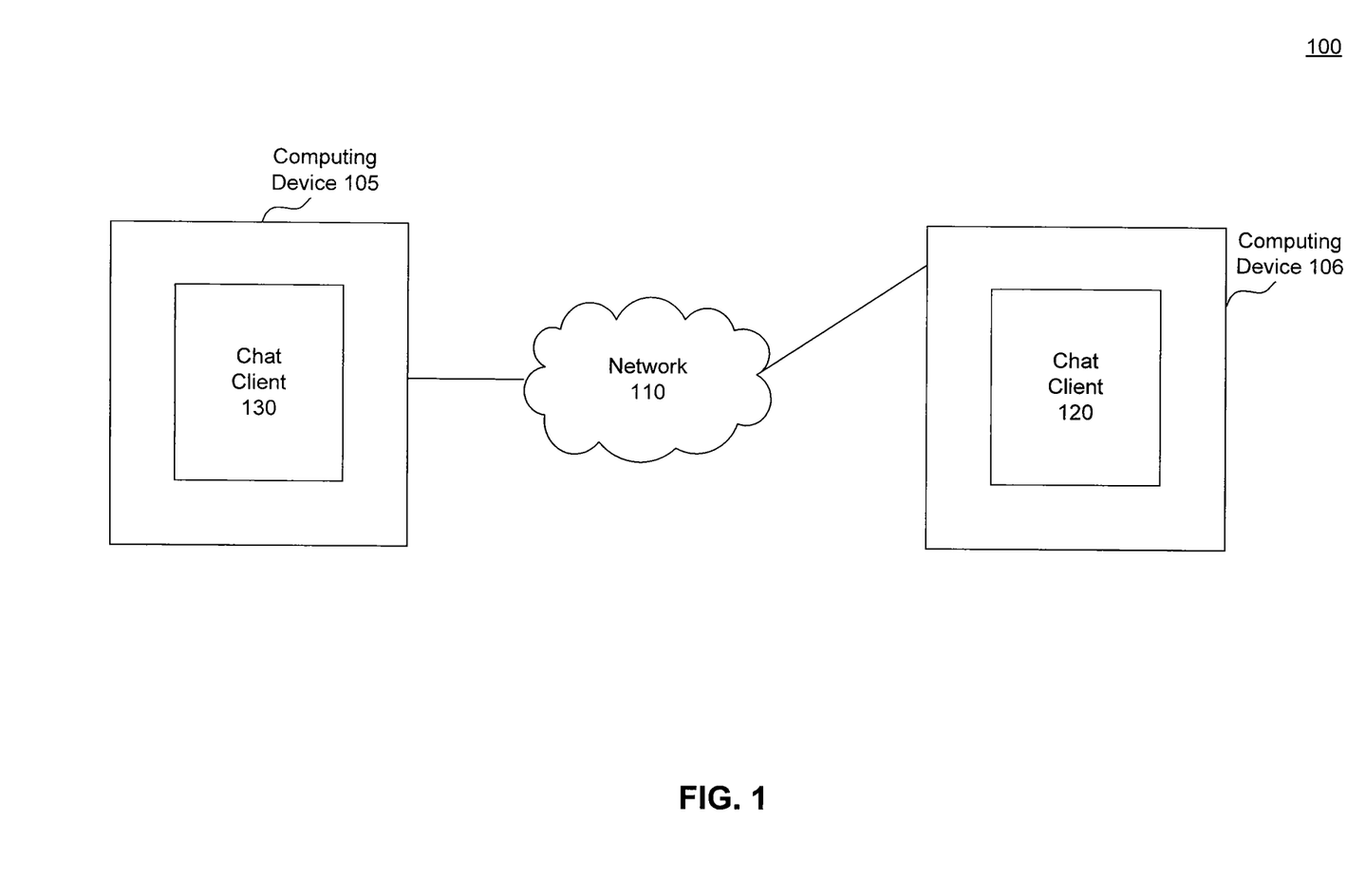
FIG. 1 is a diagram of a system for instant messaging, according to an embodiment of the invention.

FIG. 1 illustrates system 100, which is a general system architecture for monitoring the receipt of instant messages between one or more participants in a messaging environment, according to an embodiment of the invention. (While the following is described in terms of chat clients and instant messaging systems, the invention is not limited to this embodiment and other messaging environments may be used. The invention is applicable to any system having generally the structure of FIG. 1, or that would benefit from the functions as described herein.)

Network 110 can be any type of network or combination of networks such as, but not limited to, a local area network, wide area network or the Internet. Network 110 may be a form of a wired network or a wireless network, or a combination thereof. In an embodiment, network 110 allows chat client 130 and chat client 120 to communicate with each other.

Chat client 130 and chat client 120 are messaging clients (e.g. instant messaging clients), according to an embodiment of the invention. Chat clients 130, 120 may be implemented on computing device 105 and computing device 106 respectively. Computing devices 105, 106 can be any type of computing device having one or more processors. For example, computing devices 105, 106 can each be a workstation, mobile device, computer, cluster of computers, set-top box, or other device having at least one processor. Such a computing device may include software, firmware, hardware, or a combination thereof. Software may include one or more applications and an operating system. Hardware can include, but is not limited to, a processor, memory and graphical user interface display.

Although FIG. 1 illustrates two chat clients (i.e. chat client 120 and chat client 130), it is to be appreciated that system 100 can include any number of chat clients that allow other chat participants to communicate with chat client 120 and chat client 130 using network 110.

In an embodiment, chat clients 120 and 130 provide user interfaces that include conversation windows for chat participants (e.g., a sender and recipient) to input their respective chat text. As the users chat, chat clients 120 and 130 pass chat messages through network 110.

Figure 2:
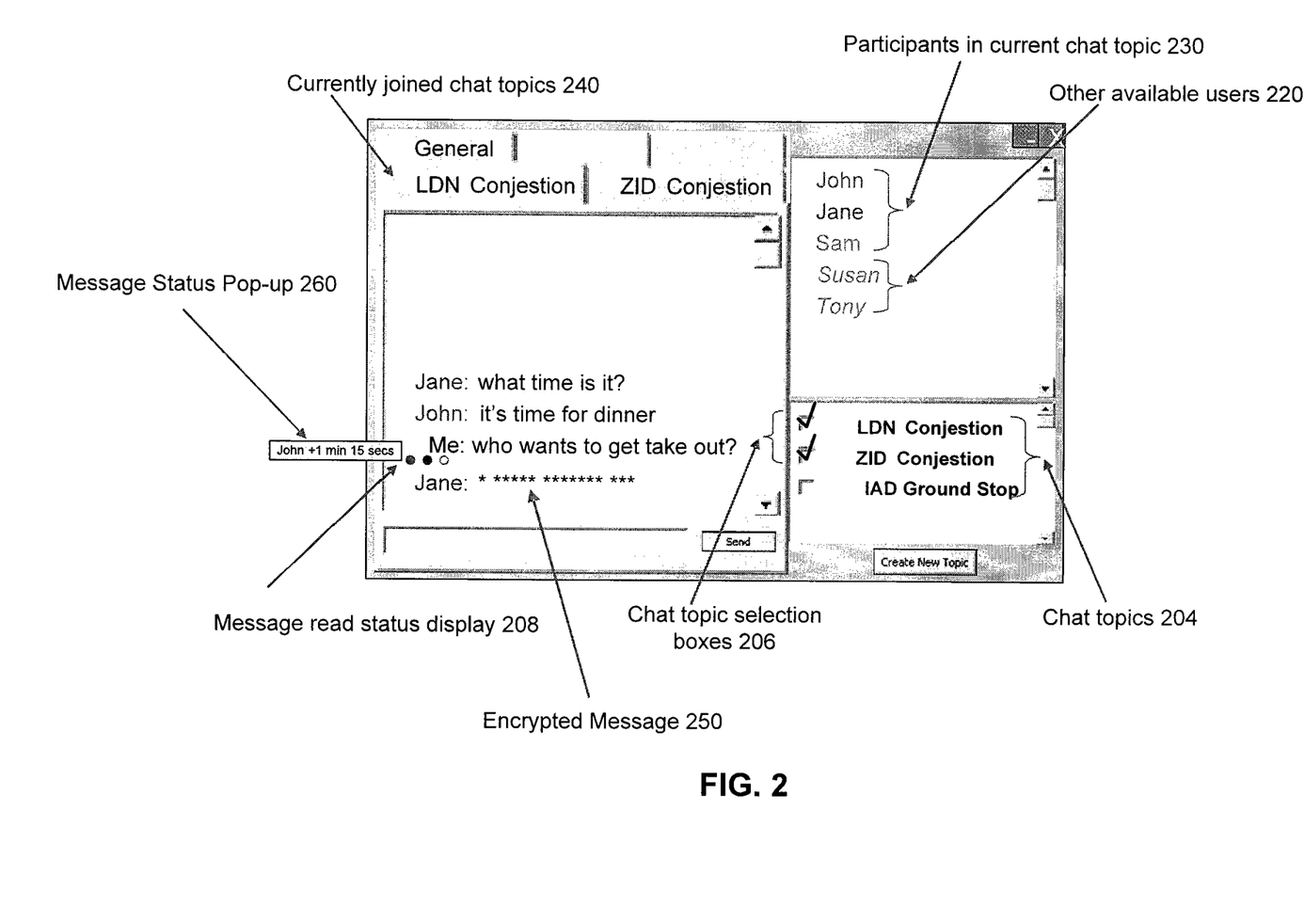
FIG. 2 is a diagram of an exemplary chat client, according to an embodiment of the invention.

FIG. 2 illustrates a diagram of chat client 130, according to an embodiment of the invention. It is to be appreciated that chat client 120 is implemented in a similar manner.

As illustrated in FIG. 2, chat client 130 includes several interaction areas that allow a chat participant (e.g., a sender or a recipient) to send and receive messages. Chat client 130 includes currently joined chat topics 240, message read status display 208, chat topic selection boxes 206, participants in current chat topic 230, other available users 220, chat topics 204, message status pop-up 260 and encrypted message 250.

Currently joined chat topics 240 displays chat topics that a user has currently joined. In an embodiment, such currently joined chat topics are displayed in the form of tabs, with a separate tab for each chat topic that a user has joined. Clicking on a tab associated with a chat topic allows that tab to become 'active' and allows the user to send and receive messages associated with that topic to and from other chat participants.

Participants in current chat topic 230 lists the participants in a currently joined chat topic. Furthermore, other available users 220 are displayed adjacent to participants in current chat topic 230. In an embodiment, participants in current chat topic 230 are displayed in color while other available users 220 are displayed as being 'grayed out'. A user of chat client 120 (or chat client 130) may select other available users 220 in order to invite one or more users to participate in a current chat topic. As an example, a user may 'right click' on other available user(s) 220 to invite a user to a chat topic. Participants in current chat topic 230 may use their own chat clients similar to chat client 120 and chat client 130.

Chat topics 204 includes one or more chat topics that are available to a user of chat client 120 (or chat client 130). A user may select one or more chat topics 204 that the user intends to participate in by selecting a check box next to the chat topic. Such a selection of one or more chat topics allows separate tabs to be instantiated for those chat topics in currently joined chat topics 240. In an embodiment, a user interaction area that includes chat topics 204 may auto-close if there are no chat topics available.

Encrypted message 250 shows a message that has been received by chat client 130 and has not yet been viewed by a user in unencrypted form. As illustrated in FIG. 2, the contents of this message are encrypted (or obscured) by chat client 130 with the '*' (i.e., asterisk) sign in a manner that the contents of encrypted message 250 are unintelligible. Specifically, in the example embodiment of FIG. 2, each character of the message has been replaced by "*". It is to be appreciated that any other icon, identifier, character or a combination thereof can be used to encrypt (or obscure) the contents of a message. Also, any other well known encryption algorithm may be used. In order to be able to view the contents of an encrypted message, a user of chat client 130 or a recipient of the message must select the message (e.g. click on the message using a mouse pointer). Such an action of clicking the encrypted message allows the recipient to view the contents of the message as intelligible text or content and also sends an acknowledgement or a 'message read confirmation' to the sender of the message indicating that the message has been viewed by participants in current chat topics 230. In an embodiment, in addition to clicking on a message, the user may be required to first use a biometric identification device such that the identity of the recipient would be transmitted back to the sender with the message acknowledgement. As an example, not intended to limit the invention, such devices may include fingerprint or retinal scanners. The method of sending an acknowledgement and displaying an un-encrypted message is described further below.

Message read status display 208 is a visual indicator of whether a particular message has been read by participants in current chat topics 230. In an embodiment, message read status display 208 may appear directly below each message sent by a user (i.e. a sender) and is only available to the sender or the author of the message. In an embodiment, message read status display 208 includes one or more identifiers (e.g. one or more circles or other icons) associated with each of the participants in current chat topics 230. The number of identifiers that appear in message read status display 208 depends on the number of participants in a current chat topic 230. As an example, if there are four participants, message read status display 208 will have four identifiers associated with each participant. In an embodiment, an identifier may be 'lighted' or filled with color when a one of the participants views an encrypted message that is sent by a sender by clicking on the encrypted message. Since the identifier is filled with color when a participant views a message, it provides a visual acknowledgement to the sender that the message has been viewed in its unencrypted form by a participant. In addition, since each identifier is associated with a unique participant, a sender is able to identify which participant has viewed the message based on the color of the identifier. It is to be appreciated that the sender can update a message status identifier by any other means, including but not limited to an icon or any other visual cue or identifier uniquely identifying the message recipient.

In an embodiment, when a user positions a mouse pointer (or similar interaction mechanism) over a color filled identifier, message status pop-up 260 identifies the name of the chat participant that read the message along with the time that has elapsed since the message was read. Other forms of information may be included within message status pop-up 260, including but not limited to, the time the message was read by a participant. Thus, a sender is able to identify if a message was read by a participant, the name of the participant reading the message and the time elapsed since the message was read by the participant.

In this way, a recipient of a message must select the message (e.g. using a mouse pointer) in order to view the message in its unencrypted (un-obscured) form. When the recipient selects the message, an acknowledgement is sent to the sender, indicating that the message has been viewed by the recipient using message read status display 208. This prevents an assumption by the sender that the message has been viewed by the recipient until it is actually viewed as intelligible content in its unencrypted form.

Exemplary Overall Operation

Figure 3:
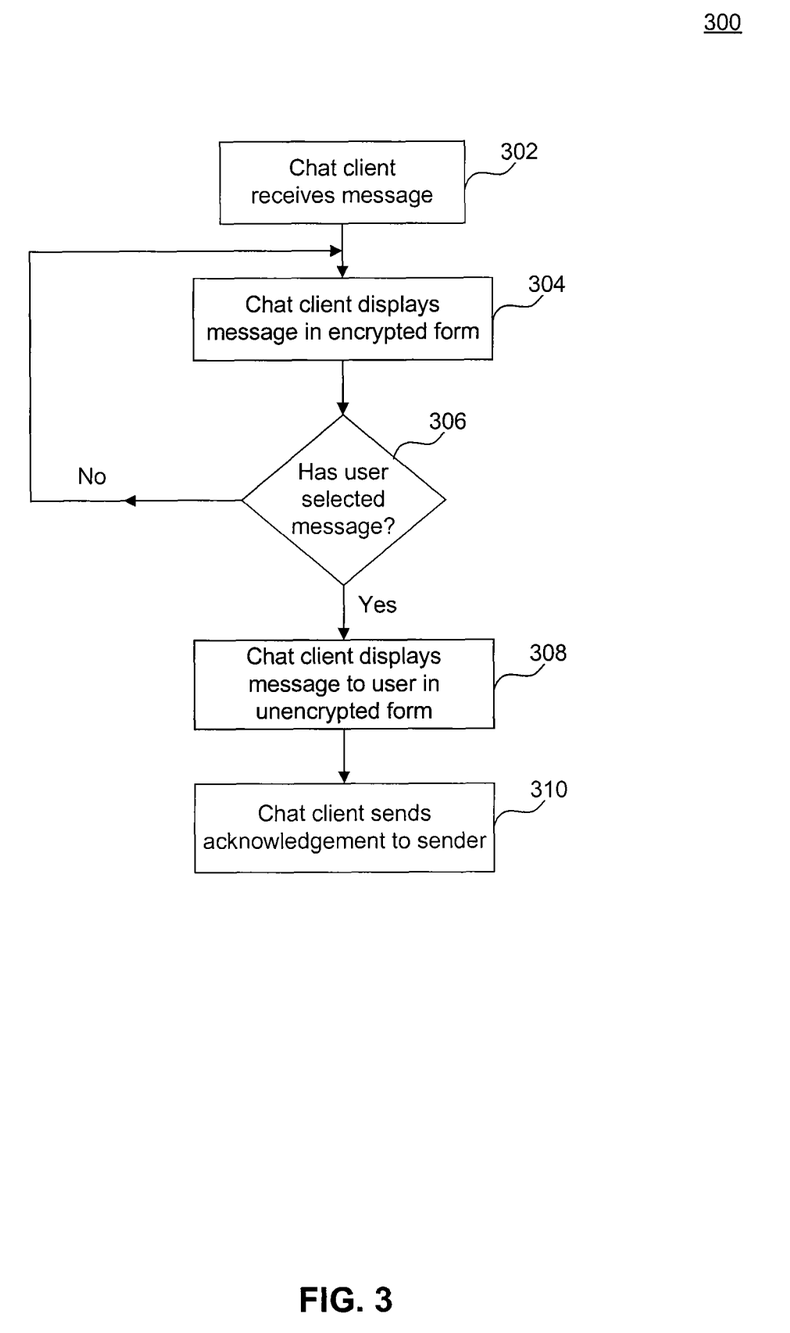
FIG. 3 is a flowchart illustrating exemplary overall operation of a system for instant messaging, according to an embodiment of the invention.

Exemplary overall operation of a system for instant messaging, according to an embodiment of the invention, will now be described in detail with reference to flowchart 300 in FIG. 3. Although the following steps are described in terms of chat client 120, it is to be appreciated that they are equally applicable to chat client 130.

In step 302, chat client 120 receives a message. As an example, such a message may be sent by a user participating in a chat from chat topics 204 using chat client 130.

In step 304, chat client 120 displays the message received in step 302 in an encrypted form to prevent intelligible content of the message from being viewed by a recipient. As an example, such an encrypted form includes (but is not limited to) displaying the contents of the message as '*' (asterisk) characters. This prevents the content of the message from being read by the recipient.

In step 306, chat client 120 checks if the recipient has selected the message. For example, chat client 120 may check if a recipient has selected the encrypted message by determining if the recipient has clicked on the message using a mouse pointer.

If the recipient has not selected the message, method 300 returns to step 304 where chat client 120 continues to display the message in its encrypted form so that it is unintelligible.

If the recipient has selected the message, chat client 120 displays the message to the user in its unencrypted form (step 308), allowing the recipient to view the message. As an example, chat client 120 displays the contents of the message to the recipient by replacing the '*' (asterisk) signs with the original human intelligible content that was sent by the sender of the message.

In step 310, chat client 120 sends an acknowledgement message to the chat client of the sender (e.g., chat client 130) indicating that the message has been viewed by the recipient.

In this way, the recipient of a message must select the message in order to view the message in its unencrypted form. When the recipient selects the message using a mouse pointer (or any other interaction method), an acknowledgement is sent to the sender, indicating that the message has been viewed by the recipient. This prevents an assumption by the sender that the message has been viewed by the recipient until it is actually viewed as intelligible content in its unencrypted form.

Updating a Message Read Status Display

Figure 4:
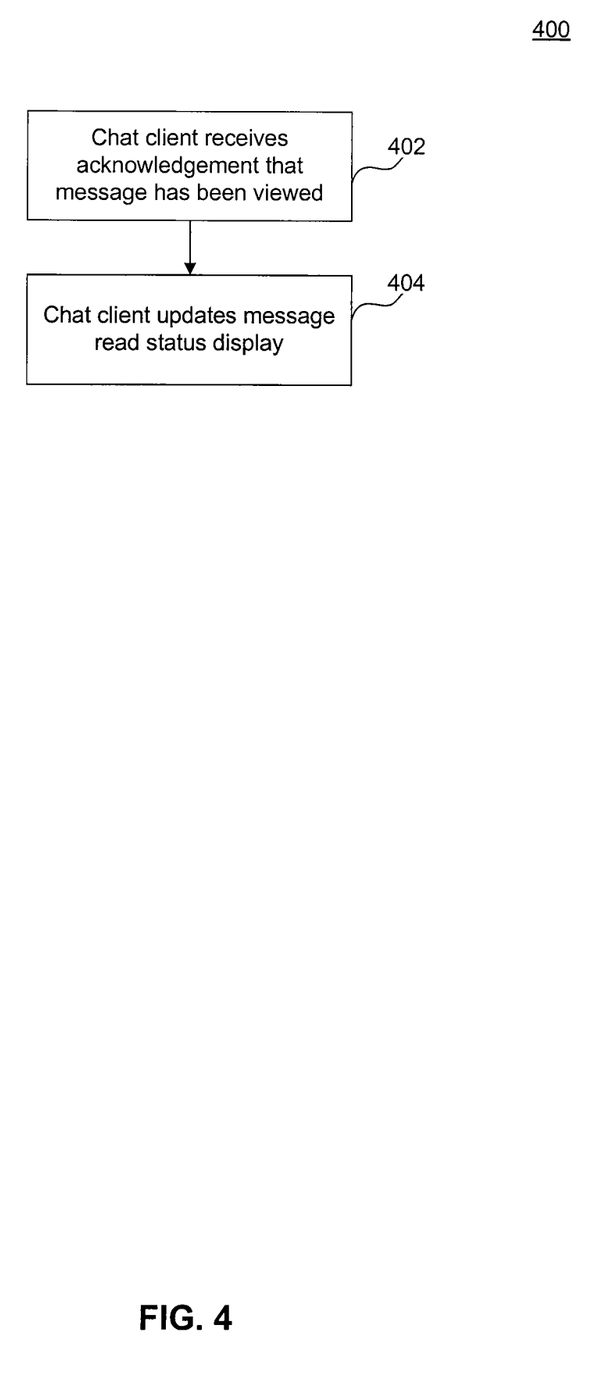
FIG. 4 is a flowchart illustrating the operation of updating message read status display, according to an embodiment of the invention.

In an embodiment, a sender's chat client (e.g., chat client 130) updates one or more identifiers in message read status display 208 based on an acknowledgement received from a recipient's chat client.

An exemplary operation of updating message read status display 208, according to an embodiment of the invention will now be described in detail with reference to flowchart 400 in FIG. 4.

In step 402, chat client 130 receives an acknowledgement from chat client 120 that the message has been viewed by a recipient. As an example, such a message may be viewed by a recipient when the recipient clicks on an encrypted message to view a message in its un-encrypted form.

In step 404, chat client 130 updates the status of the message identifiers based on which of the recipients has read the message. In an embodiment, an identifier may be 'lighted' or filled with color when one of the participants views an encrypted message by clicking on the encrypted message. Since the identifier is filled with color when the participant views a message, it provides a visual acknowledgement to the sender that the message has been viewed in its unencrypted form by the participant. It is to be appreciated that the sender can update a message status identifier by any other means, including but not limited to an icon or any other visual cue or identifier uniquely identifying the message recipient. This prevents an assumption by the sender that the message has been viewed by the recipient until it is actually viewed as intelligible content in its unencrypted form.

Example Computer Embodiment

Figure 5:
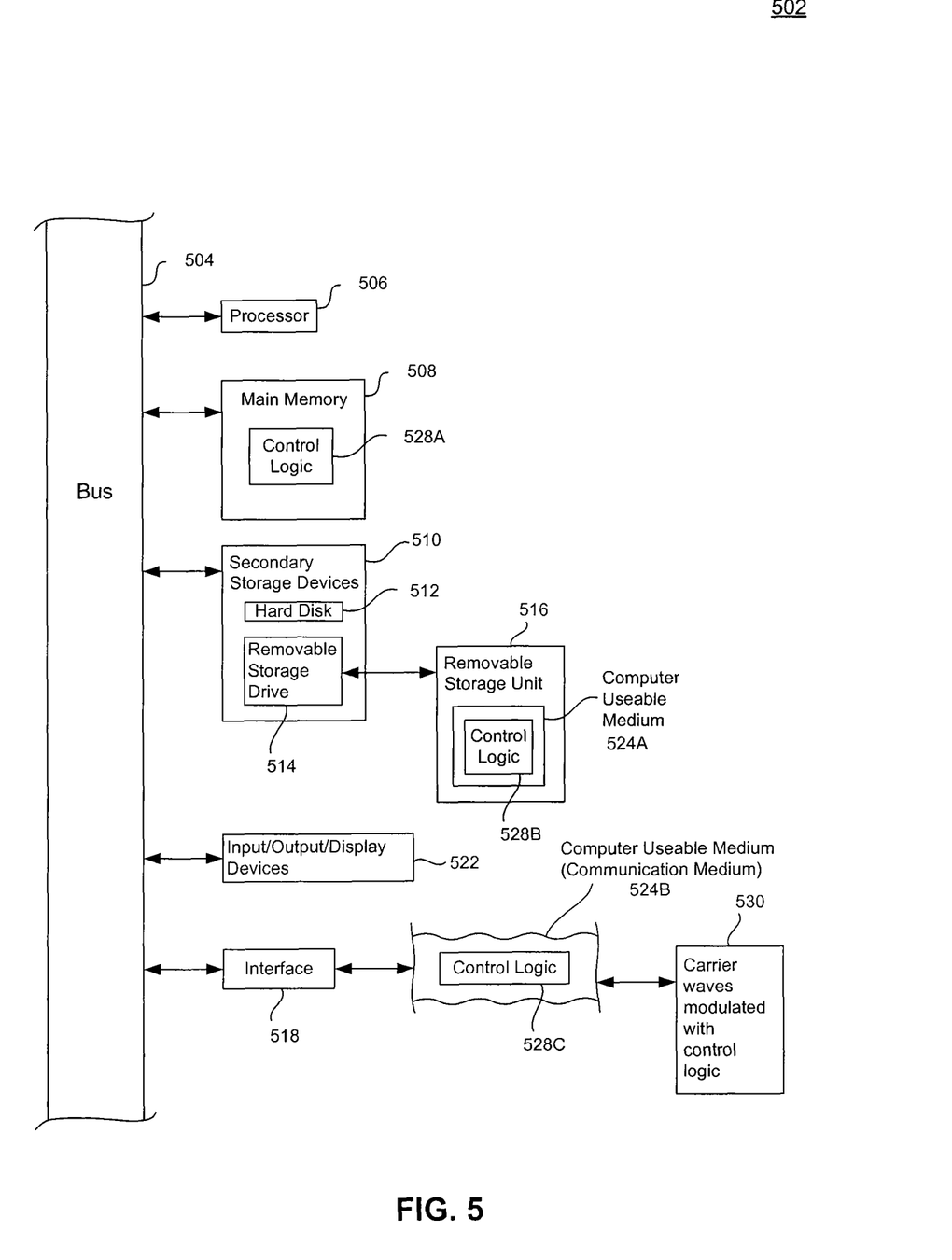
FIG. 5 illustrates an example computer useful for implementing components of embodiments of the invention.

In an embodiment of the present invention, the system and components of embodiments described herein are implemented using well known computers, such as computer 502 shown in FIG. 5. For example, chat client 120 or chat client 130 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 528A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer usable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer usable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer usable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for controlling viewing of instant messages, comprising:
   receiving a message from a sender;
   displaying the message in a human unintelligible form in a chat client of a recipient;
   requesting a biometric identification of the recipient;
   transmitting the biometric identification from the recipient to the sender together with an indication of selection and decryption of the displayed message having the human unintelligible form by the recipient, without regard to the recipient's viewing and reading of content in said message, the indication being a visual identifier distinct from the message that is lighted with a different color responsive to each recipient; and
   displaying the message in the chat client of the recipient in a human intelligible form.

2. A computer implemented method for monitoring viewing of instant messages, comprising:
   sending, by a sender, a message to a recipient, wherein the message is displayed in a human unintelligible form in a chat client of the recipient;
   and
   receiving a biometric identification from the recipient by the sender together with an indication of selection and decryption of the displayed message having the human unintelligible form by the recipient, without regard to the recipient's viewing and reading of content in the message, the indication being a visual identifier distinct from the message that is lighted with a different color responsive to each recipient.

3. A computer-based system for controlling viewing of instant messages in a chat, comprising:
   one or more memories;
   a hardware processor coupled to the one or more memories;
   a first module executed by the hardware processor and configured to receive a message from a sender;
   a second module executed by the hardware processor and configured to display the message in a human unintelligible form to a recipient;
   a third module executed by the hardware processor and configured to receive a request for a biometric identification of the recipient;
   a fourth module executed by the hardware processor and configured to transmit the biometric identification from the recipient to the sender together with an indication of selection and decryption of the displayed message having the human unintelligible form by the recipient, without regard to the recipient's viewing and reading of content in the message, the indication being a visual identifier distinct from the message that is lighted with a different color responsive to each recipient; and
   a fifth module executed by the hardware processor and configured to display the message in the chat client of the recipient in a human intelligible form and wherein the first module, the second module, the third module, the forth module and the fifth module are stored in the one or more memories.

4. The system of claim 3, wherein the selection comprises a selection of the message using a mouse pointer.

5. The method of claim 2, further comprising updating a message status identifier associated with the recipient upon the receiving.

6. The method of claim 5, wherein the updating comprises inserting a time at which the message was selected by the recipient.

7. A computer program product comprising a non-transitory computer readable medium having computer program logic recorded thereon, the computer logic when executed by a processor enabling controlling viewing of instant messages according to a method, the method comprising:
  receiving a message from a sender;
  displaying the message in a human unintelligible form in a chat client of a recipient;
  requesting a biometric identification of the recipient;
  transmitting the biometric identification from the recipient to the sender together with an indication of selection and decryption of the displayed message having the human unintelligible form by the recipient, without regard to the recipient's viewing and reading of content in the message, the indication being a visual identifier distinct from the message that is lighted with a different color responsive to each recipient; and
  displaying the message in the chat client of the recipient in a human intelligible form.

8. A computer-based system for monitoring viewing of instant messages, comprising:
  one or more memories;
  a hardware processor coupled to the one or more memories;
    a first module executed by the hardware processor and configured to send a message from a sender to a recipient, wherein the message is displayed in a human unintelligible form in a chat client of the recipient; and
    a second module executed by the hardware processor and configured to receive a biometric information from the recipient by the sender together with an indication of selection and decryption of the displayed message having the human unintelligible form by the recipient, without regard to the recipient's viewing and reading of content in the message, the indication being a visual identifier distinct from the message that is lighted with a different color responsive to each recipient and
  wherein the first module and the second module are stored in the one or more memories.

9. A computer program product comprising a non-transitory computer readable medium having computer program logic recorded thereon, the computer logic when executed by a processor enabling monitoring viewing of instant messages according to a method, the method comprising:
  sending a message from a sender to a recipient, wherein the message is displayed in a human unintelligible form in a chat client of the recipient; and
  receiving a biometric identification from the recipient by the sender together with an indication of selection and decryption of the displayed message having the human unintelligible form by the recipient, without regard to the recipient's viewing and reading of content in the message, the indication being a visual identifier distinct from the message that is lighted with a different color responsive to each recipient.

10. The computer program product of claim 9, the method further comprising updating a message status identifier associated with the recipient upon the receiving.

11. The computer program product of claim 10, the updating comprising inserting a time at which the message was selected by the recipient.

* * * * *